Nov. 14, 1939.                C. G. STRANDLUND                2,179,526
                                     PLOW
                               Filed May 2, 1938          2 Sheets-Sheet 1

INVENTOR.
CARL G. STRANDLUND
BY
ATTORNEYS.

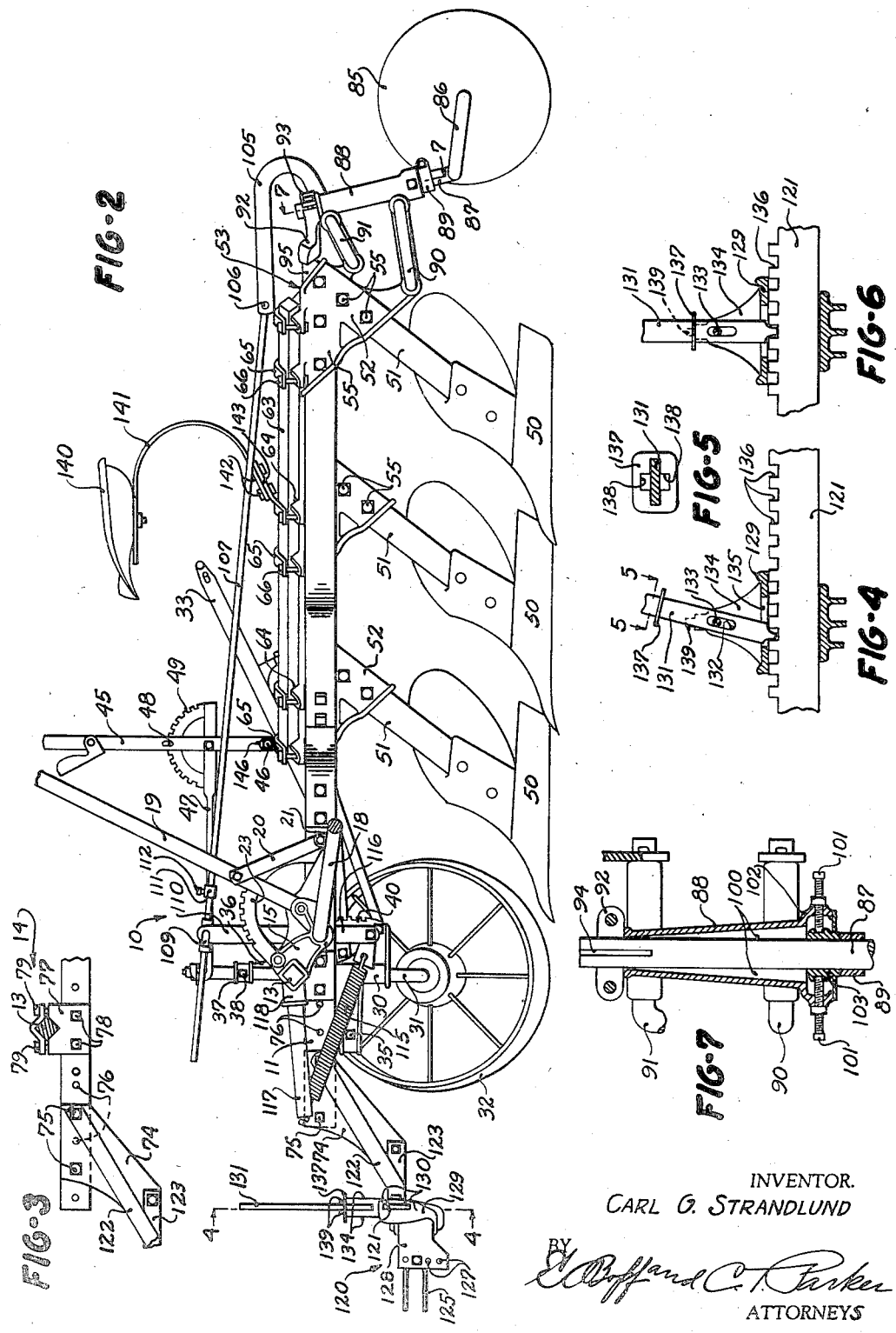

Patented Nov. 14, 1939

2,179,526

UNITED STATES PATENT OFFICE 2,179,526

PLOW

Carl G. Strandlund, Moline, Ill., assignor to Deere & Company, Moline, Ill., a corporation of Illinois Application May 2, 1938, Serial No. 205,493

13 Claims. (Cl. 97—100)

The present invention relates generally to plows and more specifically to multi-bottomed plows of the type comprising a plurality of longitudinally disposed laterally spaced beams rigidly secured together to form a unitary frame, and a plow bottom supported by each of the beams. It is frequently desirable with plows of this type to remove one set of plow bottoms and replace it with a set of bottoms of a larger or smaller size. When this is done it is necessary to change the lateral spacing between the longitudinal supporting beams, in order to adjust the lateral spacing between the plow bottoms so that the adjacent bottoms turn furrow slices which are immediately adjacent one another without leaving a strip of unturned ground therebetween. It has been common practice for many years to provide plows in which provision is made for adjusting the longitudinal beams laterally in a direction perpendicular to the line of advance of the plow. In all gang plows the several bottoms are spaced apart diagonally relative to the line of advance. That is to say, each plow bottom is spaced both laterally and longitudinally from its adjacent bottom, whereby each succeeding bottom turns its furrow slice diagonally rearwardly into the furrow formed by the preceding plow bottom. Hence, in a conventional gang plow, assuming that the diagonal clearance between the adjacent plow bottoms is sufficient to receive the furrow slice turned by the rear bottom of each pair for the closest lateral spacing, it is evident that when the lateral spacing is increased to accommodate larger plow bottoms for turning larger furrow slices, the diagonal clearance between the adjacent bottoms does not increase to the same extent as does the lateral spacing. It is, therefore, necessary to provide sufficient longitudinal spacing between the plow bottoms so that the diagonal clearance between the shares is sufficient at the widest spacing of the beams to receive the corresponding furrow slice therebetween, with the result that when the plow is set for its narrowest spacing, the diagonal clearance between the bottoms is appreciably greater than that required for the corresponding width of furrow slice, and hence the length of the plow is greater than would be necessary for a plow having a fixed spacing between the beams.

It is therefore the principal object of this invention to provide a plow, the beams of which are laterally adjustable to accommodate different sizes of bottoms, but in which the beams are also adjustable longitudinally relative to each other in order that the diagonal clearance between the bottoms can be adjusted an amount corresponding to that required by the increased width of furrow slice. More specifically, the principal object of my invention is concerned with the provision of a gang plow of the type having longitudinally extending laterally spaced supporting beams for the plow bottoms in which each longitudinally extending beam with its associated bottom is adjustable bodily along a line disposed at an acute angle to the line of advance of the implement.

A further object of my invention relates to the provision of a simplified and inexpensive but efficient draft means for the implement which is laterally adjustable relative to the plow frame by mechanical means providing a mechanical advantage by which the draft means can easily and quickly be shifted laterally into adjusted position.

Another object relates to the provision of a castering support for a rear furrow wheel in which provision is made for vertically adjusting the plane of the wheel angularly with respect to a vertical longitudinally extending plane.

Still another object relates to provision of simplified means for locking the rear furrow wheel against castering movement when the plow is in plowing position.

Still another object has to do with providing a simplified and improved seat support for the plow.

These and other objects will be made apparent by a consideration of the following description, reference being had to the appended drawings in which Figure 1 is a plan view of a plow embodying the principles of my invention, showing in dotted lines the manner in which the plow beams are adjusted both laterally and longitudinally with respect to each other;

Figure 2 is a side elevation of the plow shown in Figure 1, with the land wheel removed in order to more clearly disclose the details of construction of the plow;

Figure 3 is a fragmentary view in elevation of the forward end of one of the plow beams shown in position of adjustment illustrated in dotted lines in Figure 1;

Figure 4 is a sectional elevation taken along a line 4—4 in Figure 2 showing the details of the hitch adjusting mechanism;

Figure 5 is a detail in plan view taken along a line 5—5 in Figure 4 showing the means for locking the hitch adjusting mechanism in adjusted position;

Figure 6 is a view similar to that shown in Figure 4, but with the device in normally locked position; and Figure 7 is a section taken along a line 7—7 in Figure 2 showing the details of the rear furrow wheel castering support.

Figure 1:
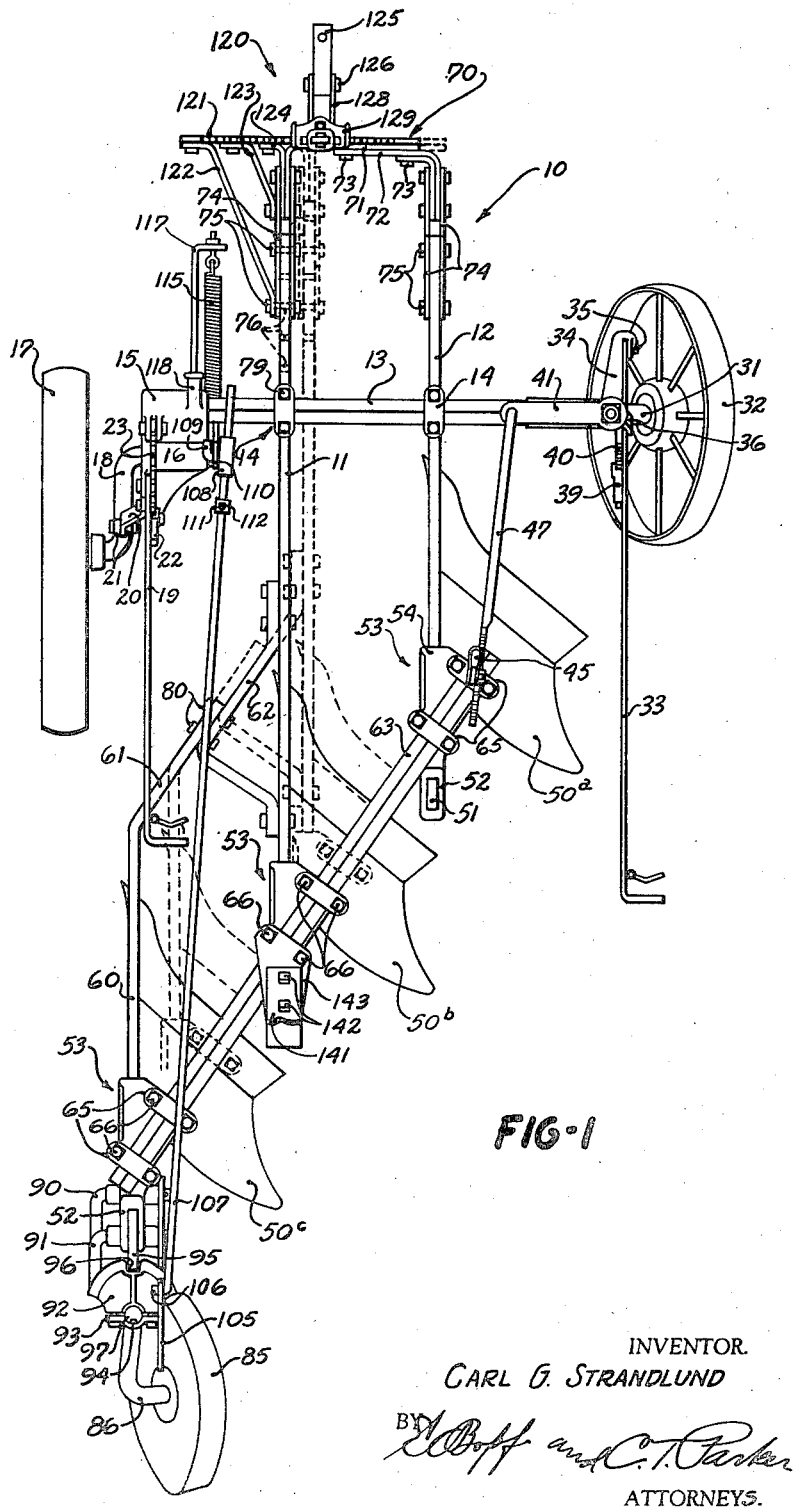

Referring now to Figures 1 and 2 of the drawings, the plow, indicated generally by the reference numeral 10, comprises a pair of longitudinally extending laterally spaced beams 11, 12 supported intermediately thereof on a transverse bracing member 13 of rectangular cross section secured to the beams 11, 12 by clamps 14 in a position in which the sides of the bracing member 13 are disposed at an angle from the horizontal. The land end of the brace 13 is fixed in a supporting casting 15 which is provided with a transversely extending bearing portion 16. A land wheel 17 is journaled on a crank axle 18, the supporting end of which is journaled in the bearing portion 16 of the casting 15. The crank axle 18 is adjusted about an axis through the bearing portion 16 by means of a hand lever 19 connected by means of a link 20 to a lug 21 on the crank axle 18. The lever is held in adjusted position by means of a latch 22 engageable with a notched sector 23 fixed on the casting 15.

The furrow end of the transverse bracing member 13 is fixed to a vertically disposed sleeve member 30 within which is disposed a wheel supporting spindle 31 slidable vertically within the sleeve 30. The furrow wheel 32 is journaled on the outwardly turned end of the spindle 31. The spindle is adjustable vertically by means of a hand lever 33 pivotally connected by means of a bolt 35 to a forwardly extending bracket 34 fixed on the sleeve member 30. The lever 33 is connected by means of a link 36 to a collar 37 which is fixed to the spindle 31 by a bolt 38. The hand lever 33 is held in any position of adjustment by means of a disengageable latch 39 which engages a notch sector 40 supported rigidly on the sleeve member 30. An inwardly laterally extending lever arm 41 is non-rotatably secured to the upper end of the spindle 31 and provides a means for steering the furrow wheel 32 by swinging about the axis of the spindle 31. The wheel 32 is steered by means of a hand lever 45 pivoted on a bolt 46 which is supported by means to be later described, and is connected by a link 47 to the lever arm 41. The steering lever 45 is fixed in adjusted position by means of a disengageable latch 48 engaged with a notched sector 49 which is fixed to the link 47.

At the rear end of each of the longitudinally extending beams 11, 12, a plow bottom 50 is supported by means of a generally vertically extending shank 51, the lower end of which is fastened to the plow bottom, the upper end of which is received within a generally vertically disposed socket portion 52 of a bracket member indicated generally by the reference numeral 53. The latter also includes a forwardly extending socket portion 54 adapted to receive the rear end of the longitudinally extending beam, and the ends of the beams 11, 12, and also the upper ends of the shanks 51 are rigidly fixed within the bracket members 53 by means of bolts 55. It will be noted that following the conventional plow design, the furrowward beam 12 is shorter than the adjacent beam 11 in order to position the plow bottom on the latter beam rearwardly as well as laterally spaced from the plow bottom 50A on the beam 12. As is well known to those skilled in the art, the reason for this arrangement is to provide a diagonal clearance between the plow bottoms 50A, 50B through which the furrow slice cut by the second plow bottom 50B may pass as it is turned into the furrow formed by the first plow bottom 50A, and the greater the width of the furrow slice cut by the plow bottom on the beam 11, the greater must be the diagonal clearance between the plow bottoms, as will be readily understood. A third plow bottom 50C is supported on the rear end of a third longitudinally extending beam 60 by means of a bracket member 53, as described above. The forward end of the longitudinally extending beam 60 has an inwardly turned forward portion 61 at an acute angle to the line of advance, which is bolted to a bracket 62 fixed to the side of the central plow beam 11. The three plow beams 11, 12, and 60 are interconnected to form a rigid unitary frame structure by means of a rear transverse bracing member 63 disposed at an acute angle to the line of advance of the plow substantially parallel to the inwardly turned portion 61 of the beam 60. Each of the bracket members 53 is provided with a V-shaped recess 64 and these recesses in the three bracket members 53 are disposed in alignment to receive the bracing member 63 which is of square cross section and set with its sides disposed at 45° from the horizontal. The transverse bracing member 63 is secured to each of the bracket members 53 by means of a pair of spaced caps 65 which embrace the upper sides of the brace 63 and are bolted to the bracket member 53 by bolts 66 on either side of the brace 63.

The forward ends of the longitudinally extending beams 11, 12 are interconnected by an extensible bracing member, indicated generally by the reference numeral 70 comprising a pair of transversely disposed juxtaposed bars 71, 72 secured together by bolts 73, each of said bars having a rearwardly turned portion which is secured between a pair of plates 74 which are in turn fixed to the forward ends of the beams 11, 12 by bolts 75 extending through apertures 76 in the beams 11, 12. The bars 71, 72 are provided each with a row of spaced bolt holes to accommodate the bolts 73, making it possible to increase or decrease the length of the extensible brace 70 to accommodate different lateral spacings between the beams 11, 12. As mentioned hereinbefore, it is desirable to not only change the lateral spacing between the beams, but also to adjust the beams longitudinally with respect to each other, in order to adjust the diagonal clearance between the plow bottoms 50A, 50B. To this end the longitudinally disposed beam 11 is provided with a row of spaced apertures 76 adapted to receive the bolts 75. Thus the beam 11 can be adjusted from the position shown in solid lines in Figure 1, to the position shown in dotted lines by removing the bolts 75 and replacing them after the beam has been moved forward. Figure 3 shows clearly the position of the beam 11 after it has been moved forwardly from the position shown in Figure 2, with the bolts 75 replaced in others of the holes 76.

When the beam 11 is adjusted forwardly or rearwardly, it must also be adjusted with respect to the securing clamps 14 by which it is fixed to the transverse brace 13. As shown in Figure 3, the lower portion 77 of the clamp 14 is bolted to the beam 11 by means of bolts 78 which are inserted through certain of the apertures 76. Therefore, when the beam 11 is to be shifted, the clamping bolts 79 are loosened to permit the clamp 14 to be shifted laterally along the brace 13 and the bolts 78 are removed to permit the beam 11 to be moved longitudinally after which the latter bolts are replaced in others of the holes 76. The beam 11 can be shifted relative to the rear transverse bracing member 63 after the securing bolts 66 have been loosened, permitting the securing bracket 53 to be slid along the bracing member 63.

Thus when the plow bottoms 50A, 50B are replaced by smaller bottoms, the second plow beam 11 is adjusted from a position shown in solid lines in Figure 1, to that shown in dotted lines in a direction parallel to the rear transverse brace 63 and thus not only narrowing the lateral spacing between the beams 11, 12 but decreasing the diagonal clearance between the plow bottoms 50A, 50B along lines parallel to the brace 63. By properly spacing the holes 76, the amount of longitudinal adjustment between adjacent bolt holes 76 can be made to correspond with the amount of diagonal adjustment of the beam 11 along the bracing member 63 when adjusting from one standard size of plow bottom to the next standard size.

The third plow beam 60 can be similarly adjusted along the bracing member 63 by loosening the securing bolts 66. The forward end 61 of the plow beam 60 can be slid along the bracket 62 by merely removing the securing bolts 80 and replacing them in other bolt holes provided for this purpose in the bracket 62. The dotted lines in Figure 1 also show the position of the third beam 60 when the plow is narrowed to accommodate smaller plow bottoms.

The rear end of the plow is supported on a rear furrow wheel 85 which is journaled on an axle 86 having an upwardly turned spindle portion 87, the latter extending upwardly through a sleeve member 88. The sleeve member bears upon a collar 89 which is rigidly clamped to the spindle 87. The sleeve member is connected to the rearmost of the bracket members 53 by a pair of links 90, 91 connected to swing about horizontal axes to permit the sleeve member 88 to be swung vertically relative to the plow in a manner which is well known to those skilled in the art, for the purpose of raising the rear end of the plow into transport. As in conventional gang plows, it is desirable to have the rear furrow wheel operate as a caster wheel when in the raised or transport position to facilitate drawing the plow around a curve. However, when the furrow wheel is swung to lower the plow into operating position, the rear furrow wheel should be held rigid against castering and bears against the furrow wall to serve as a guide for the rear end of the plow. Therefore, to lock the furrow wheel against castering when in plowing position, I have provided a locking sector 92 rigidly fixed to the upper end of the spindle 87 by means of a clamp 93, and held non-rotatably thereon by a spline 94. The sector 92 is provided with a notch 96 which is adapted to receive the upper end 95 of the rearmost plow shank 51 which is extended upwardly beyond the bracket 53 for this purpose. An extension of the plow shank provides a locking member which is extremely simple and inexpensive but effective and is easily replaced when necessary.

As shown in Figure 7, the upper end of the sleeve 88 is constricted to closely embrace the upper end of the spindle 87 which is prevented from slipping downwardly through the sleeve by means of the sector 92 clamped above the sleeve 88. The sleeve flares outwardly and downwardly from the upper end and thus provides a clearance 100 within which the spindle can be swung about a fore and aft extending axis through the constricted upper end and thus providing an adjustment in the vertical angle between the plane of the wheel 85 and a vertically longitudinally extending plane. The lower end of the spindle 87 is fixed in adjusted position by means of a pair of set screws 101 disposed in alignment on opposite sides of the spindle and in threaded engagement with the lower rim 102 of the sleeve 88 which is expanded at this point. The set screws 101 are adapted to engage a collar 103 which rotatably embraces the spindle 87. By screwing either of the set screws in and at the same time backing the opposite set screw out of the sleeve, the lower end of the spindle 87 can be swung laterally about the abovementioned fore and aft axis at the upper end of the sleeve. It will also be noted in Figure 7 that the collar 103 supports the sleeve 88 and hence the rear end of the plow, by bearing upon the clamp 89.

In accordance with conventional practice, control means are provided for swinging the rear furrow wheel vertically to raise the rear end of the plow by means of the mechanism provided for raising the front end of the plow. This control means includes a lever 105 which comprises a strap member connected between the ends of the U-shaped link 91 and extending rearwardly therefrom and then turning forwardly to a pivotal connection at 106 to a forwardly extending operating rod 107. The forward end of the control rod 107 is slidably supported in a sleeve 108 which has a laterally extending hook 109 thereto, the hook being engaged with and supported by a crank arm 110 rigidly fixed on the end of the horizontal bearing portion of the crank axle 18. Thus, when the crank axle 18 is swung from the plowing position shown in Figures 1 and 2, downwardly into transport position by means of the hand lever 19, the arm 110 slides the sleeve member 109 rearwardly along the rod 107 until it strikes a collar 111 which is fixed to the rod by means of a set screw 112, after which further swinging of the arm 110 pushes rearwardly on the rod 107 and forces the lever 105 rearwardly, causing the supporting sleeve 88 to be swung downwardly about the connecting links 90, 91, thereby raising the rear portion of the plow together with the forward portion. The lost motion between the sleeve 109 and the collar 111 is provided for the purpose of obtaining a range of depth adjustment of the plow through the land wheel crank axle 18 independent of the rear furrow wheel, the latter being swung only when the plow is to be raised. A lifting spring 115 is provided for assisting in raising the plow and is connected to a lower extension 116 of the arm 110 which is fixed to the crank axle 18. The other end of the spring is connected to a forwardly extending bracket 117 which is supported in a socket portion 118 of the casting 15.

In operation, the plow is raised and lowered between plowing position and transport position by actuating the two hand levers 19 and 33 which control the opposite sides of the plow, respectively. Leveling of the plow is accomplished by adjusting the two last mentioned levers relative to one another. The hand lever 45 is provided for adjusting the furrow wheel 32 relative to the furrow wall and to insure that the plow runs straight and has no tendency to pull to one side or the other.

The plow is provided with a hitch device, indicated generally by the reference numeral 120 which is laterally adjustable in order to accommodate the lateral adjustments of the plow beams described heretofore. The hitch device includes a transversely extending bar 121 which is supported on the transverse bracing member 70 and on several diagonal brackets 122, 123, 124, which are attached to the longitudinal beam 11 by the bolts 75. The draft clevis 125 is connected by bolt 126 disposed in one of a plurality of vertically spaced apertures 127 to a draft element 128 which is carried on a casting 129. The casting 129 is slidable laterally along the transverse bar 121 and has portions 130 embracing the bar for the purpose of transmitting draft thereto. The casting 129 is provided with means for propelling or jacking the latter along the transverse bar 121. It is desirable to provide some means for obtaining a mechanical advantage for moving this casting, especially when the evener is supported on the draft member for there is considerable weight in the evener and draft member and some tendency to bind, making it difficult to make lateral adjustments by hand without some mechanical advantage. The details of the jacking mechanism are shown in Figures 4, 5, and 6, and comprise a hand lever 131 having an elongated aperture 132 engaging a pin 133 supported between two upwardly extending fore and aft spaced portions 134 of the casting 129. The lever 131 extends downwardly through a slot 135 in the casting and is engageable with the upper edge of the bar 121 which is provided with a series of notches or recesses 136. Thus, by engaging the lever 131 in one of the notches 136, the entire hitch device 120 may be jacked or pried along the bar 121. It will be understood that by virtue of the elongated aperture 132, the lever 131 can be raised out of engagement with one recess and inserted in the next recess as the casting is moved along. The casting is locked in any position of adjustment by placing the lever 131 in a vertical position and in engagement with one of the notches 136, and is retained in this position by means of a washer 137 which slidably embraces the lever 131 and it has openings 138 to receive projections 139 on the upper ends of the upwardly extending portions 134 of the casting 129. As illustrated in Figure 6, when the washer 137 is positioned in engagement with the projections 139 and the lever 131 is in engagement with one of the notches 136, it is clear that the casting 129 is locked against lateral movement along the bar 121.

The operator's seat 140 is supported on a curved strap 141 of spring steel which is secured by bolts 142 to an upwardly extending ear 143 which is formed integrally with one of the securing caps 65 provided for clamping the diagonal brace 63. This simple means for supporting the seat eliminates the necessity for a separate clamp for clamping the seat support to one of the members of the plow frame. The lever 45 for setting the position of the furrow wheel, is also supported on one of the securing caps by means of a lug 146 welded or otherwise fixed to the upper side of one of the caps 65 and extending upwardly therefrom and to which the lever 45 is pivotally connected by means of the bolt 46.

I claim:

1. An implement of the class described, comprising a pair of laterally spaced beams extending substantially parallel to the direction of travel of the implement, a ground working tool supported on each of said beams, and means for rigidly interconnecting said beams selectively in various positions of lateral and longitudinal adjustment relative to each other, including bracing means attachable to one of said beams at any of a plurality of longitudinally spaced positions with respect thereto, and means for attaching said bracing means to the other of said beams at any of a plurality of positions spaced along the line substantially perpendicular to the direction of travel.

2. An implement comprising a pair of laterally spaced, longitudinally extending beams, a ground working tool supported on each of said beams, and means for securing said beams together to form a unitary rigid structure comprising a transversely extending brace disposed at an acute angle relative to said beams, means for rigidly connecting said brace to one of said beams, means fixed to the other of said beams for securing the latter to said transverse brace at selected points on the latter whereby said other beam is adjustable diagonally relative to the first mentioned beam, a second brace disposed substantially perpendicular to said beams ahead of said transverse brace, and means for clamping said second brace to one of said beams including a bracket, means for fixing said bracket to said second brace at spaced points along the latter, and means for fixing said bracket to said other beam at any of a plurality of longitudinally spaced positions thereon.

3. In an implement, a pair of longitudinally disposed, laterally spaced ground working tool carrying beams, and means for adjustably securing said beams together to form a rigid frame providing for both longitudinal and lateral adjustment of said beams relative to each other, comprising a transversely extending extensible bracing member, means for fixing said bracing member to one of said beams, and means for optionally fixing said bracing member to the other of said beams at a plurality of longitudinally spaced points on the latter.

4. In an implement, a pair of longitudinally disposed, laterally spaced ground working tool carrying beams, and means for adjustably securing said beams together to form a rigid frame providing for both longitudinal and lateral adjustment of said beams relative to each other, comprising a transversely extending bracing member, means for fixing said bracing member to one of said beams, a connecting bracket associated with the other of said beams and having means for adjustably fixing said bracket at selected points along said associated beam, and means for securing said bracket to said bracing member at selected points along the latter.

5. A plow comprising a pair of longitudinally disposed, laterally spaced beams, means for detachably securing plow bottoms of various sizes, selectively, adjacent the rear end of each of said beams in fixed positions relative thereto, one of said beams extending rearwardly of the other to provide a longitudinal spacing between the plow bottoms on the two beams, and means for adjustably interconnecting said beams in several positions of lateral and longitudinal adjustment relative to each other corresponding to predetermined lateral and longitudinal spacings for various sizes of plow bottoms, including an extensible transverse bracing member comprising a pair of bars disposed in juxtaposition and having means for securing said bars together in several optional positions of adjustment, and means for optionally fixing said bracing member to one of said beams in a plurality of longitudinally spaced positions relative thereto.

6. In an implement, a pair of longitudinally disposed, laterally spaced ground working tool carrying beams, and means for adjustably securing said beams together to form a rigid frame providing for both longitudinal and lateral adjustment of said beams relative to each other, comprising a transversely extending bracing member disposed near the forward ends of said beams and rigidly secured to one of the latter, a connecting bracket associated with the other of said beams and having means for adjustably fixing said bracket at selected points along said associated beam, means for securing said bracket to said bracing member at selected points along the latter, a second transversely extending bracing member disposed at an acute angle relative to said beams adjacent the rear ends thereof, means for rigidly securing said second bracing member to one of said beams, and means fixed to the other of said beams for securing the latter to said angularly disposed bracing member at selected points on the latter, whereby said beams are adjustable diagonally with respect to each other.

7. An implement comprising a pair of longitudinally disposed, laterally spaced beams, a connecting bracket fixed to the rear end of each of said beams, a ground working tool shank fixed to each of said brackets, a bracing member extending transversely of said beams at an acute angle relative thereto, means for clamping each of said connecting brackets to said bracing member at selected points along the latter, a second transverse bracing member disposed near the forward ends of said beams, and means for securing both of said beams to said second bracing member in selected adjusted positions of said beams relative to each other.

8. An implement comprising in combination a pair of fore and aft extending, laterally spaced beams, a bracket member associated with each of said beams, including a socket adapted to receive its respective beam, means for securing said beam within said socket, said bracket having a second socket portion extending generally vertically, a ground working tool carrying shank fixed in each of said second socket portions, a bracing member disposed transversely of said beams at an acute angle therewith, said bracket members having aligned recesses to receive said bracing member and means for rigidly clamping said bracket members to said bracing member at several optional spacings along the latter, a second transverse bracing member disposed near the forward ends of said beams, and means for securing both of said beams to said second bracing member in any of said optional spacings along said angularly disposed bracing member.

9. In a plow, a fore and aft extending beam, a bracket fixed to the rear end thereof, a ground working tool carrying shank fixed to said bracket and extending downwardly therefrom, the upper end of said shank extending upwardly beyond said bracket, a rear furrow wheel supporting standard connected to said bracket for vertical swinging movement between plowing and transport positions, a wheel carrying spindle journaled on said standard, and means on said spindle adapted to engage said upper extension of said tool carrying shank to fix said spindle relative to said standard when the latter swings into said plowing position.

10. In a plow, a fore and aft extending beam, a bracket having a socket adapted to receive said beam, means for securing said beam within said socket, said bracket having a second socket portion extending generally vertically, a ground working tool carrying shank fixed in said second socket and extending upwardly beyond said bracket, a rear furrow caster wheel, a pair of cooperative swivelling supporting members for supporting said caster wheel, the latter being journaled on one of said members, the other of said members being connected to said bracket for vertical swinging movement between plowing and transport positions, and means on said one member engageable with said upward extension of said tool shank when said furrow wheel swings into said plowing position for preventing said wheel from castering in plowing position but permitting castering thereof when in transport position.

11. In an implement, a pair of fore and aft extending, laterally spaced beams, a bracket member associated with each of said beams, including a socket adapted to receive its respective beam, means for securing said beam within said socket, said bracket having a second socket portion extending generally vertically, a ground working tool carrying shank fixed in each of said second socket portions, a transversely disposed bracing member for interconnecting said beams to form a unitary rigid frame, said bracket members having aligned recesses to receive said bracing member, securing caps adapted to embrace the bracing member and having means for rigidly fastening said caps to said bracket members, respectively, one of said caps having a supporting lug fixed thereto, a seat support, and means for fixing said seat support to said supporting lug.

12. In a plow comprising a longitudinal beam and a ground working tool carrying shank extending downwardly therefrom, a rear furrow wheel support carried on said beam by means providing for vertical movement relative thereto when said plow is raised and lowered, a wheel spindle journaled in said support providing a castering action when said plow is in raised position for transport, and a member fixed to said spindle and movable therewith, said member having a recess adapted to receive a portion of said shank when said wheel support is swung to lower the plow into operative position, whereby said wheel is restrained from castering during plowing operation.

13. In a plow comprising a longitudinally extending beam and a ground working tool carrying shank extending downwardly therefrom, a rear furrow wheel support, means connecting the latter to said beam providing for vertical movement relative thereto when said plow is raised and lowered, a caster wheel spindle journaled in said support providing a castering action when said plow is in raised position for transport, means for adjustably swinging said spindle in a transverse plane about a point near the upper end thereof, and a notched member fixed to said spindle near said center of swinging adjustment, said tool carrying shank being moved into a notch in said notched member when the plow is lowered into plowing position, said notched member being adapted to restrain said rear furrow wheel spindle from castering movement during plowing.

CARL G. STRANDLUND.